(12) United States Patent
Herrington et al.

(10) Patent No.: US 10,744,811 B2
(45) Date of Patent: Aug. 18, 2020

(54) POLYESTER CANVAS CARD

(71) Applicant: Capital One Services, LLC, McLean, VA (US)

(72) Inventors: Daniel Herrington, New York, NY (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/265,477

(22) Filed: Feb. 1, 2019

(65) Prior Publication Data
US 2019/0329583 A1  Oct. 31, 2019

Related U.S. Application Data

(63) Continuation of application No. 15/963,585, filed on Apr. 26, 2018, now Pat. No. 10,357,989.

(51) Int. Cl.
*B42D 25/29* (2014.01)
*B42D 25/305* (2014.01)
(Continued)

(52) U.S. Cl.
CPC ............. *B42D 25/29* (2014.10); *B32B 5/024* (2013.01); *B32B 7/12* (2013.01); *B32B 27/12* (2013.01); *B42D 25/305* (2014.10); *B42D 25/328* (2014.10); *B42D 25/47* (2014.10); *B32B 2250/02* (2013.01); *B32B 2250/03* (2013.01); *B32B 2307/75* (2013.01); *B32B 2425/00* (2013.01)

(58) Field of Classification Search
CPC ...... B42D 25/29; B42D 25/305; B42D 25/47; B42D 25/328; B32B 7/12; B32B 5/024; B32B 27/12; B32B 2425/00; B32B 2250/03; B32B 2307/75; B32B 2250/02
USPC .... 283/67, 72, 74, 75, 83, 94, 98, 101, 901, 283/904
See application file for complete search history.

(56) References Cited

U.S. PATENT DOCUMENTS 9,953,258 B1    4/2018  Suthar
2013/0320095 A1 12/2013 Blum
2018/0330221 A1* 11/2018 Fischer .................... B32B 5/22

FOREIGN PATENT DOCUMENTS

EP         3373206 A2    9/2018
WO  WO-2017081268 A1 *  5/2017  ............... B32B 5/22

OTHER PUBLICATIONS

Communication and Search Report, issued from the European Patent Office in corresponding Application No. 19171355.1-1202, dated Aug. 13, 2019 (9 pages).

* cited by examiner

*Primary Examiner* — Justin V Lewis
(74) *Attorney, Agent, or Firm* — Finnegan, Henderson, Farabow, Garrett & Dunner, LLP

(57) ABSTRACT

Disclosed embodiments generally relate to a transaction card having a substrate component with a first substrate surface opposite a second substrate surface; a fabric component having a first fabric surface opposite a second fabric surface, the fabric and substrate being joined along the second fabric surface and the first substrate surface, the fabric component defining one or more apertures; and one or more electronic components disposed in the one or more apertures, the one or more electronic components and substrate being joined along a first electronic component surface and the first substrate surface.

19 Claims, 7 Drawing Sheets

(51) Int. Cl.
*B42D 25/328* (2014.01)
*B42D 25/47* (2014.01)
*B32B 5/02* (2006.01)
*B32B 7/12* (2006.01)
*B32B 27/12* (2006.01)

POLYESTER CANVAS CARD

This application is a continuation of U.S. patent application Ser. No. 15/963,585, filed on Apr. 26, 2018 (pending), and entitled "POLYESTER CANVAS CARD." The disclosure of the above-referenced application is expressly incorporated herein by reference in its entirety.

TECHNICAL FIELD

The disclosed embodiments generally relate to transaction card constructions. More particularly, and without limitation, the disclosed embodiments relate to a transaction card having a writeable fabric surface.

BACKGROUND

Transaction cards, such as credit and debit cards, have become a primary means for individuals to complete transactions involving data exchange. Traditional transaction cards are formed of plastic material as a single piece. For example, a typical credit card may be manufactured out of PVC plastic using an injection molding process. The plastic card may then be modified to add functional and/or visual features. For example, a magnetic strip may be affixed to one side, the card may be stamped with the card number and customer name, and color or a design may be added for appearance. Some plastic cards may also be formed of several layers of plastic using a lamination process.

Some transaction cards may also include advanced data storage components attached to or embedded within the card. For example, some transaction cards may include microchips (e.g., EMV chips) that more securely and efficiently manage card and customer information and/or near field communication (NFC) components that can wirelessly communicate with outside devices (e.g., a point of sale device, mobile device, etc.). While these types of technology provide several advantages to customers, the conventional, one-piece transaction card and associated methods of construction may not be ideal and could likely benefit significantly from improvements.

In addition, as transaction cards increase in prevalence, expectations for transaction card quality have increased. Moreover, current trends and advances in technology and social media have created demand for unique and customizable products. Many consumers and influencers choose products and services that match their personal brand or that allow the flexibility to customize a product to fit their personal brand. However, traditional custom transaction cards may allow a user to upload an image or select from a menu of stock images to be printed on a card, but do not give the customer full, creative flexibility to easily design a transaction card. Also, transaction cards have increasingly been made to meet higher standards regarding materials, durability, security, and appearance, but have limited ability for user customization.

The present disclosure is directed to improvements in transaction cards and methods of manufacture thereof.

SUMMARY

The disclosed embodiments relate to a transaction card and a process/method for constructing the card, wherein the card includes a writeable fabric surface.

According to a disclosed embodiment, a transaction card, may include: a substrate component having a first substrate surface opposite a second substrate surface; a fabric component having a first fabric surface opposite a second fabric surface, the fabric and substrate components being joined along the second fabric surface and the first substrate surface, the fabric component defining an aperture; and an electronic component disposed in the aperture, the electronic component and substrate being joined along a first electronic component surface and the first substrate surface.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include a transaction card with a writeable fabric surface. The writeable surface may comprise a fabric material, e.g., canvas. Disclosed embodiments further include a transaction card having two or more separate card components that may be connectable to form the transaction card. Various methods may be used to manufacture the separate card components out of different types of materials that are suitable for satisfying certain criteria or preferences. In addition, the construction of the separate components may allow for ease of assembly, as well as interchangeability of the components.

The term "transaction card," as used herein, may refer to a physical card product that is provided with features to receive, store, and/or transmit transaction information. Examples of transaction cards may include credit cards, debit cards, gift cards, rewards cards, frequent flyer cards, merchant-specific cards, discount cards, identification cards, membership cards, and driver's licenses, but are not limited thereto.

As used herein, the term "personal information" may include information that is associated with a user of the card or information associated with an account of/for the card user. For example, personal information may include "transaction information," such as financial information (e.g., card numbers, account numbers, expiration dates etc.), quasi-financial information (e.g., rewards balance, discount information, etc.), individual-identifying information (e.g., name, address, etc.), bank information, and/or transaction network information.

The physical properties of the transaction card (e.g., size, flexibility, location of various components included in the card) may meet various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

Figure 1:
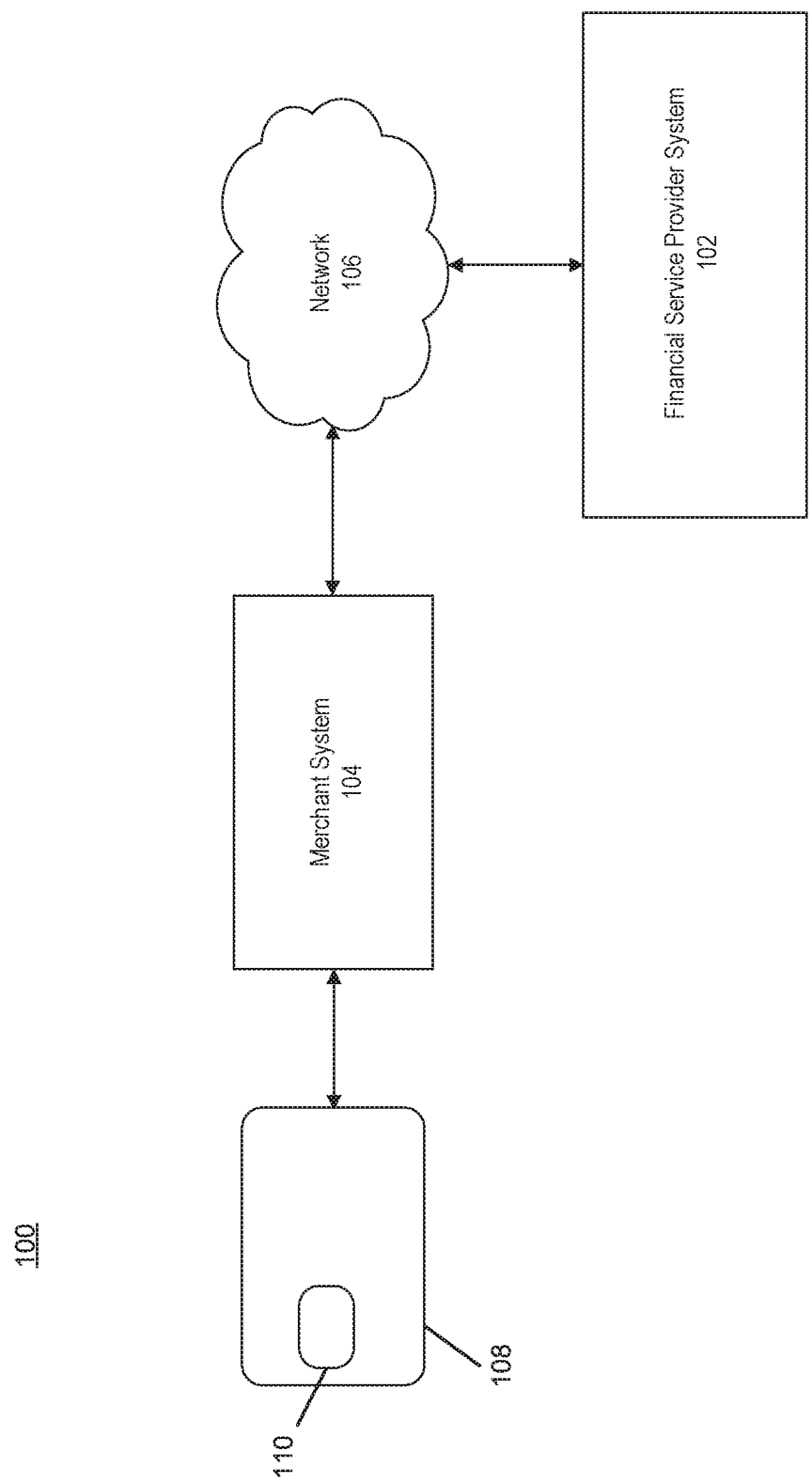
FIG. 1 is a block diagram of an exemplary transaction system, consistent with disclosed embodiments.

FIG. 1 illustrates an exemplary transaction system 100. Transaction system 100 may be a computing system configured to receive and send information between the components of transaction system 100 and/or with components outside of system 100. Transaction system 100 may include a financial service provider system 102 and a merchant system 104, which may be connected by a network 106. It should be understood, however, that transaction system 100 may include additional and/or alternative components.

Financial service provider system 102 may be one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service account. Financial service accounts may be associated with physical financial service transaction cards, such as a credit or debit cards that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online.

Merchant system 104 may be one or more computer systems associated with a merchant. For example, merchant system 104 may be associated with an entity that provides goods and/or services (e.g., a retail store). The merchant may include brick-and-mortar location(s) that a customer may physically visit and purchase goods and services. Such physical locations may include computing devices (e.g., merchant system 14) that perform financial service transactions with customers (e.g., POS terminal(s), kiosks, etc.). Additionally or alternatively, merchant system 104 may be associated with a merchant who provides electronic shopping mechanisms, such as a website or a similar online location that consumers may access using a computer through browser software, a mobile application, or similar software. Merchant system 104 may include a client device, such as a laptop computer, desktop computer, smart phone, kiosk, or tablet that a customer may operate to access the electronic shopping mechanism.

Network 106 may be any type of network that facilitates communications and data transfer between components of transaction system 100, such as, for example, financial service provider system 102 and merchant system 104. Network 106 may include but is not limited to a Local Area Network (LAN), a Wide Area Network (WAN), such as the Internet, and may be a single network or a combination of networks. Network 106 is not limited to the above examples, and transaction system 100 may implement any type of network that allows the entities (shown and not shown) of transaction system 100 to exchange data and information.

Transaction system 100 may be configured to conduct a transaction associated with the use of a transaction card 108. In one example, financial service provider system 102 may provide transaction card 108 to a customer for use in conducting transactions associated with a financial service account held by the customer. In an example of one such transaction, the customer may use transaction card 108 at a merchant location to make a purchase. During the course of the purchase, information may be transferred from transaction card 108 to merchant system 104 (e.g., a point of sale device). Merchant system 104 may communicate with financial service provider system 102 via network 106 to complete the transaction. For example, merchant system 104 may receive account information from transaction card 108. Merchant system 104 may transmit the account information and a purchase amount, among other transaction information, to financial service provider system 102. Financial service provider system 102 may settle the transaction by transferring funds from the customer's financial service account to a financial service account associated with the merchant.

For example, in some embodiments, transaction card 108 may include a data storage component 110. As used herein, a "data storage component" may consist of or include one or more devices configured to receive, store, process, provide, transfer, send, delete, and/or generate data or other information. For example, data storage component 110 may include a microchip (e.g., EMV chip), a communication device (e.g., Near Field Communication (NFC) antenna, radiofrequency identification (RFID) device, Bluetooth® device, WiFi device), a magnetic strip, a barcode, a Quick Response (QR) code, and/or other devices. Data storage device 110 may be configured to store information in a computer-readable format. For example, data storage device may be configured to store information in a format that can be read by merchant system 104, transmitted over network 106, and read or processed by financial service provider system 102.

While transaction system 100 and transaction card 108 are depicted and described in relation to transactions that involve customers, merchants, and financial service providers, it should be understood that these entities are used only as an example to illustrate one environment in which transaction card 108 may be used. It should be understood that transaction card 108 is not limited to financial products and may be any physical card product that is configured to receive, store, and/or transmit information. For example, transaction card 108 may be an identification card configured to provide information for identifying the holder of the card (e.g., driver's license).

Figure 2:
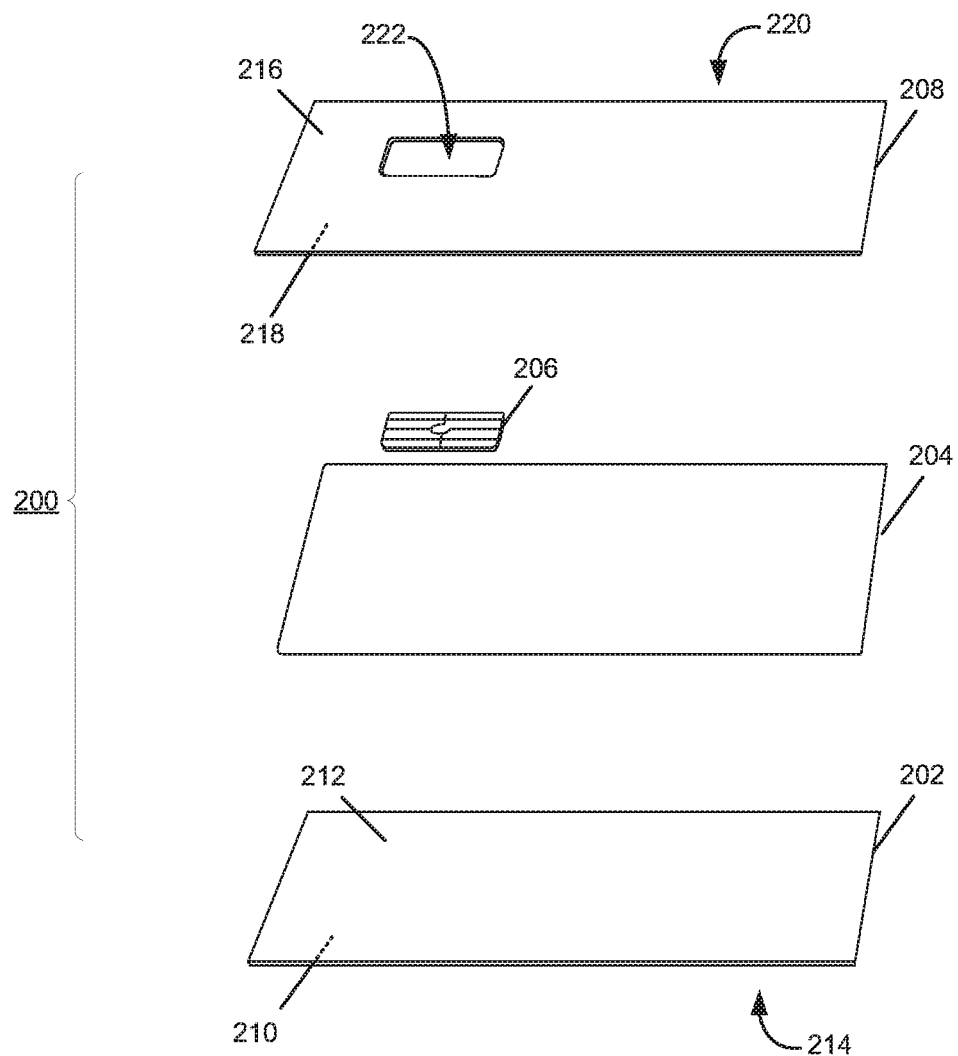
FIG. 2 is an exploded-view illustration of an exemplary transaction card, consistent with disclosed embodiments.

Referring to FIG. 2, in an exemplary embodiment, a transaction card 200 (which may be, for example, transaction card 108) may include a substrate component ("substrate") 202, an adhesive material 204, an electronic component 206, e.g., a microchip or data storage component, and a fabric component 208.

Substrate 202 may have a first substrate surface 212 and a second substrate surface 210. Second substrate surface 210 may be visible from a second side 214 of card 200 and, as described below, may include visible information (e.g., personal information).

Substrate 202 may be a bottom outward-facing component of card 200. Substrate 202 may be formed of multiple separate components or as a unitary structure. For example, substrate 202 may be formed using molding process, such as an injection molding, compression molding, or other type of molding process. Substrate 202 may be formed of, for example, polycarbonate (PC), polyvinyl chloride (PVC), or a resin mixture configured to impart additional or desired properties on substrate 202. For example, substrate 202 may be formed of a resin mixture comprising one or more of a thermoplastic elastomer (TPE), polybutylene terephthalate (PBT), an acetal homopolymer, and/or other materials. In some embodiments, the TPE and/or other materials may be selected to provide card 200 with a "soft-touch feel" (i.e., a haptic sensation that occurs when a person touches something that, for example, feels soft, smooth, and/or satiny). In some embodiments, the resin mixture may include a polyester elastomer, a block copolymer, a thermoplastic olefin, an elastomeric alloy, a thermoplastic polyurethane, a thermoplastic copolyester, or a thermoplastic polyamide. In some embodiments, substrate 202 may be non-opaque (e.g., translucent, transparent, clear, etc.) after manufacturing is complete (e.g., after setting).

Adhesive material 204 may be disposed between substrate 202 and fabric component 208 and configured to bond surface 212 of substrate 202 to surface 218 of fabric component 208. Adhesive material 204 may be a thermoplastic, polymer, or glue disposed between substrate 202 and fabric 208 in a layer. In some embodiments, adhesive material 204 may join electronic component 206, disposed in aperture 222, to surface 212 of the substrate 202. In other embodiments, a different adhesive material from adhesive material 204 may secure electronic component 206 to surface 212. In some embodiment, polyvinyl chloride may be disposed between surface 212 and electronic component 206.

Electronic component 206 may be a microchip (e.g., an EMV chip). In some embodiments, transaction card 200 may include a communication device, e.g., an NFC or RFID device, disposed between substrate 202 and fabric component 208. In other embodiments, transaction card 200 may be configured to at least partially include other or additional types of data storage components and/or other card components and is not limited to those mentioned above.

In other embodiments, electronic components, in addition to, or instead of electronic component 206, may be disposed between substrate 202 and fabric component 208. For example, an antenna or RFID component may be affixed to either first substrate surface 212 or second fabric surface 218 prior to joining substrate 202 and fabric component 208. In another example, an electronic component may be disposed on adhesive layer 204 prior to joining substrate 202 and fabric component 208.

Fabric component 208 may have a first fabric surface 216 and a second fabric surface 218. First fabric surface 216 may be visible from a first side 220. Substrate 202 and fabric component 208 may be joined by adhesive material 204 disposed between first substrate surface 212 and second fabric surface 218. In some embodiments, substrate 202 and fabric component 208 may be joined without adhesive, by for example, a lamination process. In some embodiments, substrate 202 and fabric component 208 may be joined using a thermoplastic material disposed between first substrate surface 212 and second fabric surface 218.

As will be described in further detail below, fabric component 208 may be a top outward-facing component of card 200. In some embodiments, fabric component 208 may include a woven fabric material, which may be visible from first side 220 or second side 214 of card 200. Fabric component 208 may be a canvas material or other heavy cotton fabric. Fabric component 208 may be a material capable of receiving ink deposited by a writing tool, for example, a permanent marker, felt-tip marker, fabric marker, paint marker, felt-tip pen, etc. Fabric component 208 may be washable. For example, fabric component 208 may be configured to receive ink and to subsequently be wiped clean with water or with soap and water.

The fabric material of fabric component 208 may be chosen to achieve desired stiffness, strength, and/or other measures of durability. In order to achieve these desired characteristics, parameters of the fabric material may be varied. For example, the fabric material may be woven, knit, or nonwoven, may be constructed with different weaving patterns, may use different yarn weights, may contain different fabric finishes or coatings, fiber compositions including natural and/or synthetic fibers, and may contain varying thread counts.

In some embodiments, the fabric material may be a woven fabric constructed using a specific weaving pattern. For example, the fabric material may be constructed using, for example, any of the following weaving patterns: plain (or alternating), basket, satin, sateen, twill, ripstop, or jacquard. By constructing the fabric material using different weaving patterns, the fabric material may have different mechanical properties. For example, a fabric component 208 constructed using a plain weave may provide additional fabric stability. In other embodiments, a fabric component 208 constructed using a ripstop weave with a crosshatch pattern containing reinforcement threads may be more resistant to ripping or tearing.

In some embodiments, the type of weaving pattern used to construct the fabric material may enhance other desired characteristics for the fabric material, such as water, stain, or abrasion resistance. For example, in some embodiments, additional abrasion resistance may be gained where the weaving pattern used to construct the fabric material includes longer floats in the weaving pattern. In some embodiments, the density of the weaving pattern (i.e., the number of threads in a given amount of space) used to construct the fabric material of fabric component 208 may create a fabric material with limited or no porosity in order to enhance water and stain resistance.

In some embodiments, the fabric material may be constructed using yarns of a specific weight. For example, in some embodiments, a fabric component 208 constructed using a fabric with higher weight will produce a sturdier fabric. In some embodiments, the fabric material may contain a specific thread count to obtain desired characteristics. The thread count may be calculated by counting the total number of warp ends (along the length) and weft ends (along the width) in two adjacent edges of a one-inch square of the fabric. For example, in some embodiments, a high thread count fabric may be used to construct the fabric material of fabric component 208 in order to obtain a more durable fabric.

In some embodiments, the fabric material may be formed of hydrophilic fibers such that the fabric material accepts and retains water-based ink. For example, the fabric material may be formed of cotton, rayon, wool, or linen. In other embodiments, the fabric material may be a synthetic material, e.g., polyester, coated with a hydrophilic polymer able to receive and retain ink. The ink may be, for example, any water-based ink found in ball-point pens, markers, fabric markers, permanent markers, ink-jet printers, and/or gel pens. The fabric material may be configured to accept iron-on decals and/or fabric stickers.

Card 200 may be configured to permit, enable, or enhance data transmission functions of electronic component 206. For example, in some embodiments, aperture 222 may be provided on or in fabric component 208 to permit, enable, and/or enhance transmission functions of electronic component 216. Aperture 222 may be configured to allow electronic component 206 to transmit information through physical contact, optical recognition, radiofrequency communication, or other mechanisms. In other embodiments, aperture 222 may also or alternatively be provided on or in substrate 202. Aperture 222 may be formed using a laser-cutting process, stamping process, or another suitable process.

Figure 3A:
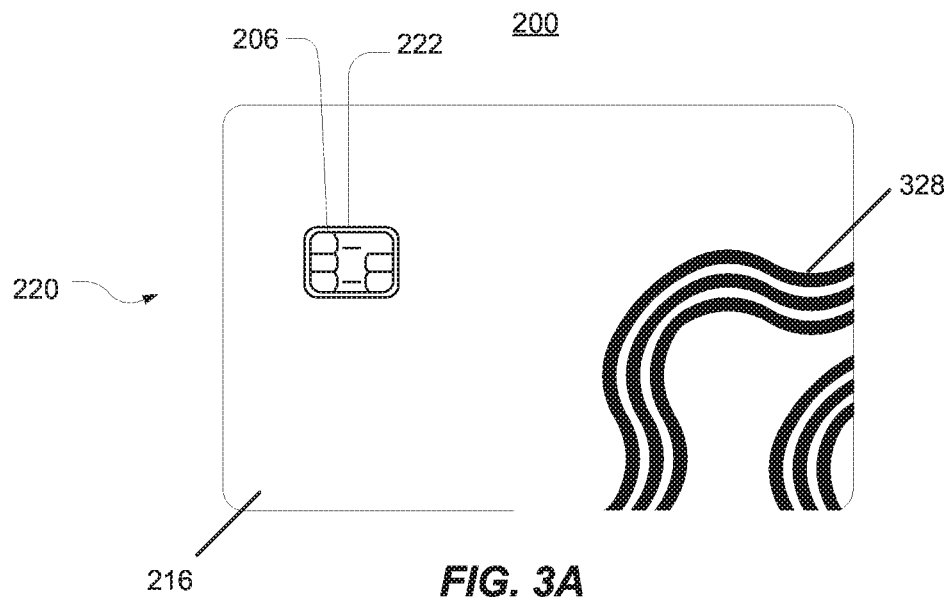
FIG. 3A is a top view of an exemplary transaction card consistent with disclosed embodiments.

FIG. 3A shows a front view of card 200 from first side 220. Second fabric surface 216 may be visible from first side 220. In some embodiments, an aperture 222 may be formed in fabric component 208 and may be configured to provide access to or enable functionality of an electronic component 206 (e.g., an EMV chip). Fabric surface 216 may receive ink 328 applied by a user of card 200 to personalize or customize card 200. During manufacturing, fabric surface 216 may be blank or may include a logo or design printed on fabric surface 216. A user may personalize fabric surface 216 in any design or pattern, or may apply any hand-written text or signature. In some embodiments, the user may print any desired design on the fabric surface 216.

In some embodiments, a signature or other markings on first fabric surface 216, visible from side 220 of card 200, may be used to authenticate the user or to provide validation of the user's signature. For example, the user may configure a mobile application or financial account, via a device having a camera, to recognize the card 200 based on the unique markings added by the user.

Figure 3B:
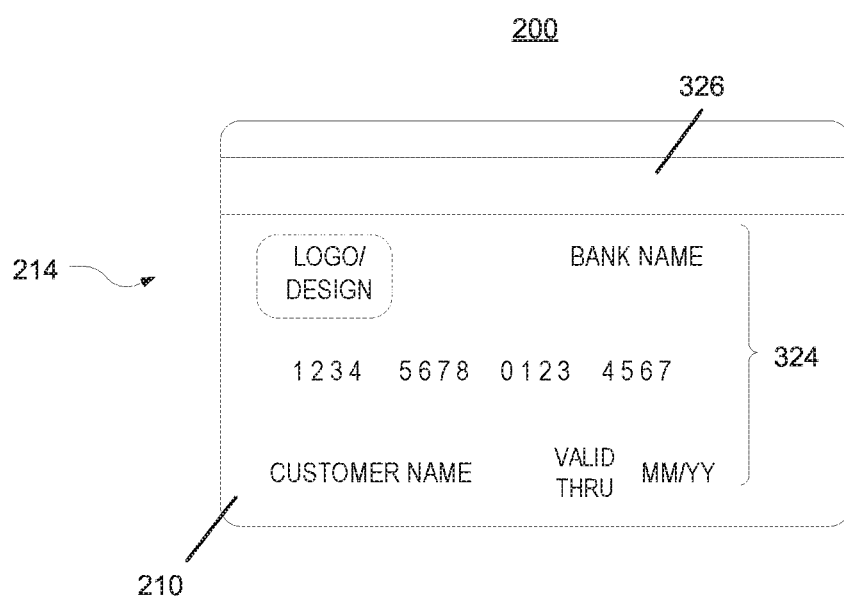
FIG. 3B is a bottom view of the exemplary transaction card of FIG. 3A.

FIG. 3B shows a rear view of card 200 from second side 214. As shown, substrate surface 210 may include visible information 324. Visible information 324 may include, for example, personal information, such as information that is associated with a card, a user of the card, or information relating to an account associated with the card or card user. In some embodiments, visible information 324 may include "transaction information," such as financial information (e.g., card numbers, account numbers, expiration dates etc.), individual-identifying information (e.g., name, address, signature, etc.), bank information, and/or transaction network information, logos, designs, graphics, and/or other information.

In some embodiments, visible information 324 may be formed into second substrate surface 210. That is, for example, visible information 324 may be stamped (i.e., through the formation of one or more mechanical indents), printed, etched, milled, laser-cut, embossed, embroidered, stitched, woven, etc., into or onto second substrate surface 210.

In some embodiments a magnetic strip 326 may be disposed on or accessible from (i.e., readable from) second substrate surface 210. In other embodiments, an aperture (not shown) may be disposed on second substrate surface 210 and configured to provide access to or enable functionality of a data storage component. In other embodiments, one or more data storage components may be disposed within card 200 (e.g., in a cavity between substrate 202 and fabric component 208) and configured to perform data transmission functions through the material of substrate 202 and/or fabric component 208 without an aperture.

Figure 4A:
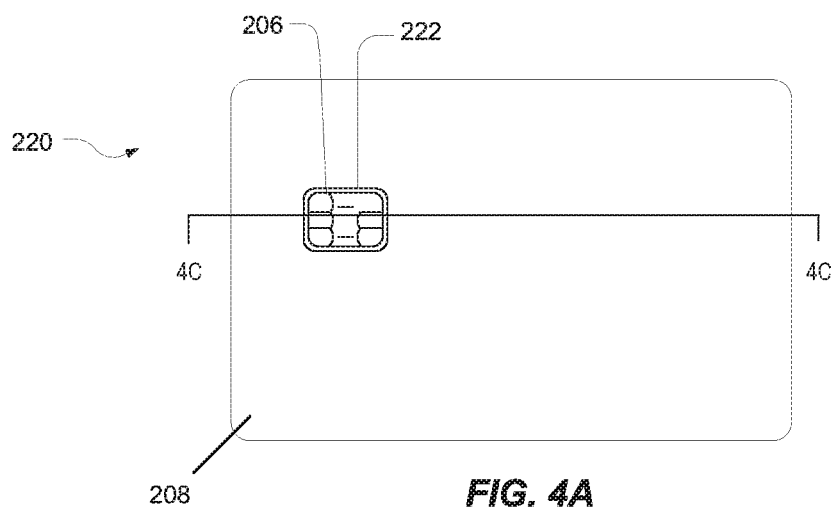
FIG. 4A is a top view of an exemplary transaction card consistent with disclosed embodiments.
Figure 4B:
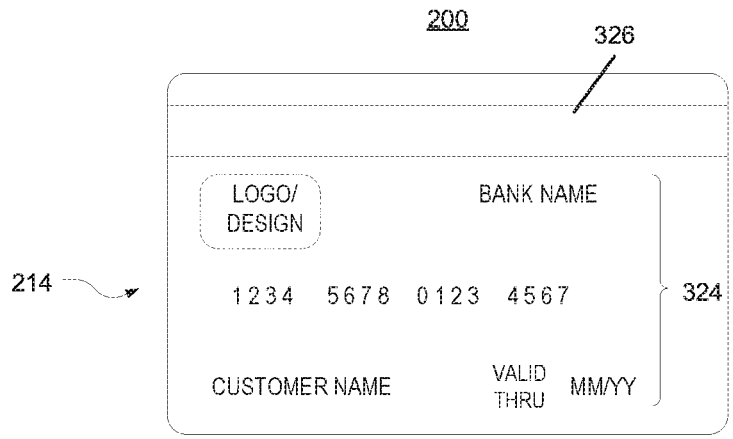
FIG. 4B is a bottom view of the exemplary transaction card of FIG. 4A.
Figure 4C:
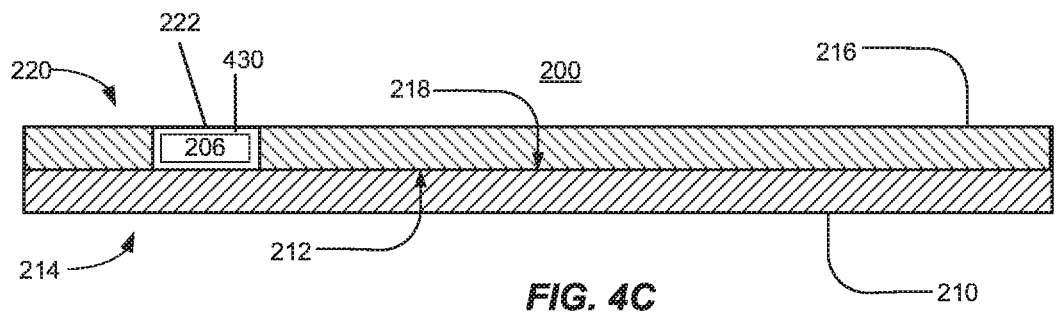
FIG. 4C is a cross-sectional view of the exemplary transaction card of FIG. 4A taken along line 4C-4C.

FIGS. 4A-4C show an exemplary embodiment of card 200 having an electronic component 206, e.g., a microchip. FIG. 4A shows a front view of card 200 from first side 220. As shown, fabric component 208 may include aperture 222. Electronic component 206 may be accessible (i.e., able to participate in data transfer) via aperture 222. As shown in FIG. 4B, a second data storage component, such as a magnetic strip 326, may be disposed on substrate 202 and visible from second side 214 of card 200.

FIG. 4C depicts a cross-sectional view of card 200 of FIGS. 4A and 4B along line 4C-4C. As shown in FIG. 4C, aperture 222 may partially define space 430. Space 430 may be a void space within card 200 or its components (e.g., within one or more of substrate 202 and fabric layer 208). Space 430 may be configured to house or contain electronic component 206. In the embodiment of FIG. 4C, space 430 may extend from first fabric surface 216 to below first substrate surface 212, but not to second substrate surface 210. That is, space 430 may extend through fabric component 208 and partially through substrate 202. In other embodiments, space 430 may extend fully or only partially through fabric component 208, but not into substrate 202.

As also shown in FIG. 4C, substrate 202 and fabric component 208 may be joined via second fabric surface 218 and first substrate surface 212. First fabric surface 216 may face outward (with respect to card 200) and away from first and second substrate surfaces 212, 210. That is, first fabric surface 216 may face and be visible from first side 220 of card 200. Second fabric surface 218 may face inward (with respect to card 200) and toward first and second substrate surfaces 212, 210. First substrate surface 212 may face inward (with respect to card 200) and toward first and second fabric surfaces 216, 218. Second substrate surface 210 may face outward (with respect to card 200) and away from first and second fabric surfaces 216, 218. That is, second substrate surface 210 may face and be visible from second side 214 of card 200.

As used herein, the term "forming," when used to describe methods, processes, or steps of forming components or features of transaction cards, may encompass acts of constructing components from constituent or stock materials. The term "forming" may also encompass acts of "providing" components that have already been constructed from constituent or stock materials.

Figure 5:
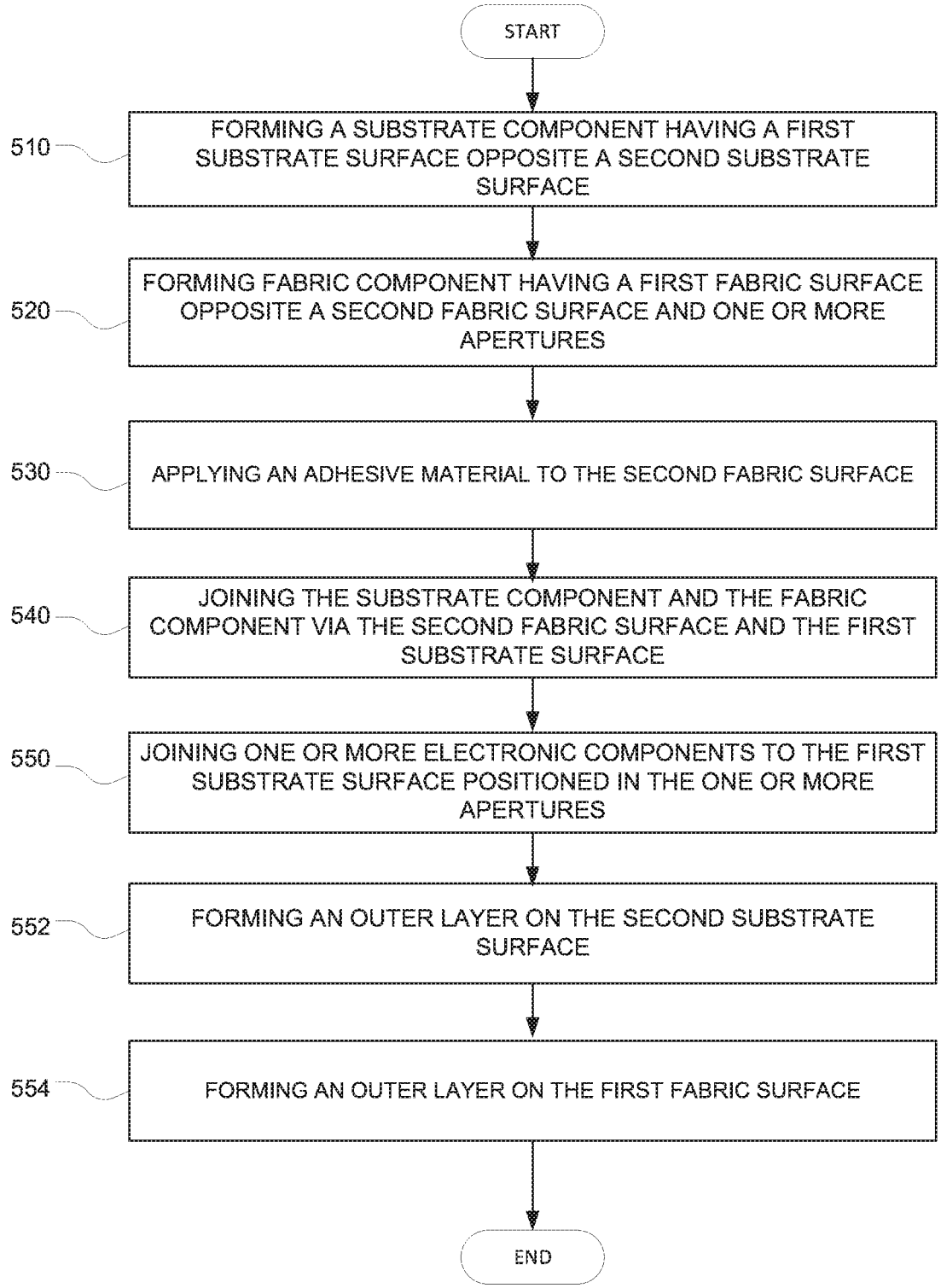
FIG. 5 is a flow chart of exemplary method/process steps of forming a transaction card consistent with disclosed embodiments.
Figure 6A:
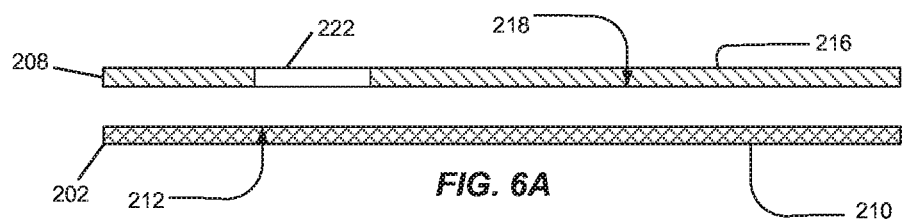
FIG. 6A shows a first step of manufacturing an exemplary transaction card consistent with disclosed embodiments.

FIG. 5 shows an exemplary method/process 500 of forming a transaction card 200 having a writeable surface consistent with disclosed embodiments. Process 500 may include forming a substrate component having a first substrate surface opposite a second substrate surface (Step 510). FIG. 6A illustrates an example of step 510 in which fabric component 208 and substrate component 202 may be formed separately (i.e., as distinct components via separate, respective processes). Substrate 202 may be formed during step 510, for example, by a molding process (e.g., injection molding, compression molding, etc.), milling process, stamping process, sheet forming process, or combinations thereof. For example, substrate 202 may be formed by laminating a plurality of polyvinyl chloride sheets to form a rigid structure.

Process 500 may also include forming a fabric component having a first fabric surface opposite a second fabric surface (Step 520). Fabric component 208 may be formed during step 520, shown in FIG. 6A. For example, forming fabric component 208 may include weaving, knitting, or binding fibers of desired material, or by cutting or otherwise separating a portion of fabric material from a roll or sheet of stock material. In some embodiments, fabric component 208 may be formed from a canvas material using any of the previously described techniques.

Aperture 222 may be formed in fabric component 208 by laser cutting, punching, trimming, or another method. Aperture 222 may be formed such that electronic component 206 is accessible through fabric component 208 and readable by one or more devices to transmit data.

Figure 6B:
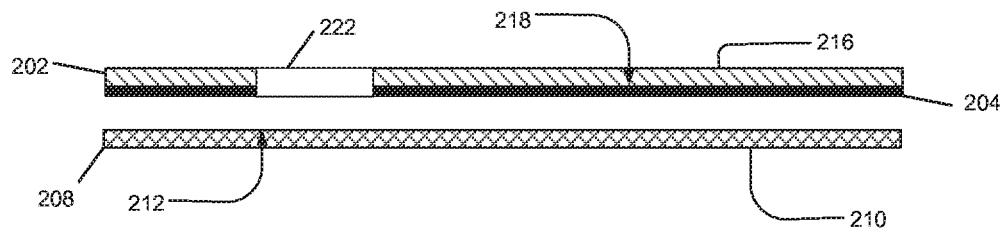
FIG. 6B shows a second step of manufacturing an exemplary transaction card consistent with disclosed embodiments.

Process 500 may also include applying an adhesive material to the second fabric surface 218 of fabric component 208 (Step 530). FIG. 6B illustrates an example of step 530 in which an adhesive material 204 is disposed on second fabric surface 218. Adhesive material 204 may be sprayed, brushed, or otherwise applied to second fabric surface 218 by, for example, spray deposition, sputter deposition, lamination, or other technique known to one of skill in the art. In some embodiments, adhesive material 204 may be applied to substrate 202 or to both substrate 202 and fabric component 208.

Figure 6C:
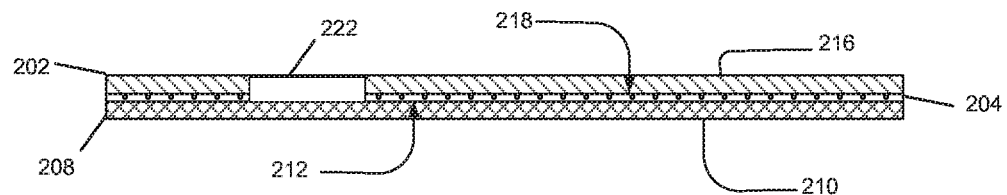
FIG. 6C shows a third step of manufacturing an exemplary transaction card consistent with disclosed embodiments.

Process 500 may also include joining the substrate component and the fabric component via the second fabric surface and the first substrate surface (Step 540). With reference to FIGS. 6B and 6C, substrate 202 and fabric component 208, including adhesive 204, may be brought together during step 540 such that second fabric surface 218 faces and/or contacts first substrate surface 212. First fabric surface 216 and second substrate surface 210 may face away from each other (i.e., in opposite directions), and may each face away from each of second fabric surface 218 and first substrate surface 212. In some embodiments, substrate 202 and fabric component 208 may by joined using interconnecting features, fasteners, and/or another types of joining technique or mechanism.

Figure 6D:
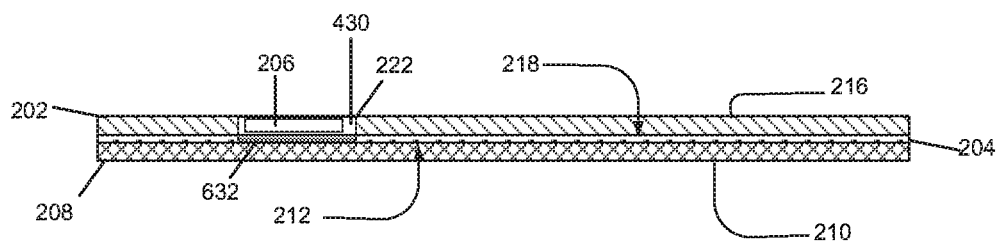
FIG. 6D shows a fourth step of manufacturing an exemplary transaction card consistent with disclosed embodiments.

Process 500 may also include affixing an electronic component 206 to first substrate surface 212 (step 550). With reference to FIG. 6D, electronic component 206 may be disposed in the space 430 defined by aperture 222. In some embodiments, electronic component 206 may be affixed to first substrate surface 212 by an adhesive 632. Adhesive 632 may be the same as adhesive material 204, or may be a different adhesive material. In some embodiments, adhesive 632 may be a thermoplastic material, e.g., polyvinyl chloride.

In addition to the steps described above, process 500 may also include disposing visible information on the second substrate surface. Visible information may include, for example, personal information, such as information that is associated with a card, a user of the card, or information relating to an account associated with the card or card user. In some embodiments, visible information may include "transaction information," such as financial information (e.g., card numbers, account numbers, expiration dates etc.), individual-identifying information (e.g., name, address, signature, etc.), bank information, and/or transaction network information, holographic images, logos, designs, graphics, and/or other information. Visible information may be disposed on second substrate surface 210. In some embodiments, visible information may be formed into second substrate surface 210. That is, for example, visible information may be stamped, printed, etched, milled, laser-cut, embossed, etc., into or onto second substrate surface 210. In some embodiments, visible information may include raised alphanumeric characters, e.g., account number or account holder name.

Figure 6E:
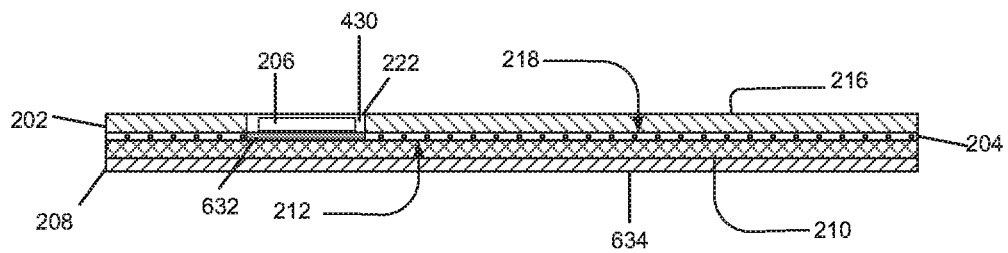
FIG. 6E shows a fifth step of manufacturing an exemplary transaction card consistent with disclosed embodiments.

In some embodiments, process 500 may further include a step 552 of forming an outer layer on substrate 202. For example, as shown in FIG. 6E, a transparent layer 634 may be disposed on second substrate surface 210 by dipping card 200 in a coating material or laminating a transparent material on surface 210. Layer 634 may improve or enhance the mechanical properties of substrate 202 and/or protect the visible information on second substrate surface 210.

Process 500 may also further include a step 554 of forming an outer layer on surface 216 of the fabric material 208. For example, a coating material may be disposed on first fabric surface 216, to protect first fabric surface 216 from the elements. In such an example, coating material may be applied to first fabric surface 216 to provide water-repellant, water-resistant, and/or oleophobic (i.e., stain resistant).

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A method for forming a transaction card, comprising:
forming a substrate component having a first substrate surface opposite a second substrate surface;
forming a fabric component with an aperture, the fabric component having a first fabric surface opposite a second fabric surface;
joining the fabric component and substrate component by joining the second fabric surface to the first substrate surface such that the first fabric surface comprises an outermost writeable fabric surface;
affixing an electronic component to the first substrate surface of the substrate component.

2. The method of claim 1, wherein the substrate component is formed by of at least one of molding, milling, stamping, or sheet forming.

3. The method of claim 1, wherein the substrate component comprises a material of at least one of fiberglass, metal, or plastic.

4. The method of claim 1, wherein the fabric component is formed by at least one of weaving, knitting, binding fibers, or cutting from a roll of stock material.

5. The method of claim 1, wherein the aperture is formed by at least one of laser cutting, punching, or trimming.

6. The method of claim 1, wherein the fabric component and substrate component are joined by applying an adhesive between the second fabric surface and the first substrate surface.

7. The method of claim 1, wherein the electronic component comprises at least one of a microprocessor, a radiofrequency identifier, or a microchip.

8. The method of claim 1, wherein affixing the electronic component to the first substrate surface comprises applying an adhesive between the first substrate surface and a first electronic component surface of the electronic component.

9. The method of claim 8, wherein the adhesive is a thermoplastic material.

10. The method of claim 9, wherein the thermoplastic material comprises polyvinyl chloride.

11. The method of claim 1, the method further comprising:
disposing visible information on the second substrate surface of the substrate component.

12. The method of claim 11, wherein the visible information comprises raised alphanumeric characters.

13. The method of claim 1, the method further comprising:
forming an outer layer on the second substrate surface.

14. The method of claim 13, wherein the outer layer is disposed on the second substrate surface by at least one of dipping the transaction card in a coating material or laminating a transparent material on the surface.

15. The method of claim 1, the method further comprising:
disposing a coating material on the first fabric surface.

16. The method of claim 15, wherein the coating material is disposed on the first fabric surface by at least one of dipping the transaction card in a coating material or laminating a transparent material on the surface.

17. The method of claim 1, the method further comprising:
disposing a magnetic strip on the second substrate surface.

18. The method of claim 17, wherein the magnetic strip is joined to the second substrate surface with a thermoplastic material.

19. A transaction card, comprising:
a substrate component having a first substrate surface opposite a second substrate surface;
a fabric component having an aperture and a first fabric surface opposite a second fabric surface, the fabric and substrate components being joined along the second fabric surface and the first substrate surface, wherein the first fabric surface comprises an outermost writeable fabric surface; and
an electronic component affixed to the first substrate surface.

* * * * *